United States Patent
Hsu et al.

(10) Patent No.: US 12,368,238 B2
(45) Date of Patent: Jul. 22, 2025

(54) ANTENNA CORRECTION SYSTEM

(71) Applicant: AUDEN TECHNO CORP., Taoyuan (TW)

(72) Inventors: Yung-Tai Hsu, Taoyuan (TW); Chun-Heng Chao, Taoyuan (TW); Yen-Wei Wang, Taoyuan (TW); Bo-Yu Zhu, Taoyuan (TW)

(73) Assignee: AUDEN TECHNO CORP., Taoyuan (TW)

( * ) Notice: Subject to any disclaimer, the term of this patent is extended or adjusted under 35 U.S.C. 154(b) by 337 days.

(21) Appl. No.: 17/989,638

(22) Filed: Nov. 17, 2022

(65) Prior Publication Data
US 2024/0145911 A1 May 2, 2024

(30) Foreign Application Priority Data
Oct. 28, 2022 (TW) ................................. 111141025

(51) Int. Cl.
*H01Q 3/26* (2006.01)
*H01Q 3/30* (2006.01)
*H04B 17/12* (2015.01)
*H04B 17/21* (2015.01)

(52) U.S. Cl.
CPC ............... *H01Q 3/26* (2013.01); *H01Q 3/267* (2013.01); *H01Q 3/30* (2013.01); *H04B 17/12* (2015.01); *H04B 17/21* (2015.01)

(58) Field of Classification Search
CPC . H01Q 3/26; H01Q 3/267; H01Q 3/30; H04B 17/12; H04B 17/21
USPC ................................................ 342/368, 372
See application file for complete search history.

(56) References Cited

U.S. PATENT DOCUMENTS

| | | | | |
|---|---|---|---|---|
| 6,600,445 B2 * | 7/2003 | Li | ........................... | H01Q 1/246 342/368 |
| 7,545,321 B2 * | 6/2009 | Kawasaki | .............. | H01Q 3/267 342/368 |
| 8,730,111 B2 * | 5/2014 | Sakata | ................. | G01R 29/105 343/703 |
| 9,264,123 B2 * | 2/2016 | Das | ........................ | H04B 17/26 |

(Continued)

FOREIGN PATENT DOCUMENTS

| | | | | |
|---|---|---|---|---|
| CN | 105940552 A | * | 9/2016 | ............. H01Q 3/267 |
| JP | 2001237756 A | | 8/2001 | |
| TW | 201436364 A | | 9/2014 | |

*Primary Examiner* — Chuong P Nguyen
(74) *Attorney, Agent, or Firm* — Li & Cai Intellectual Property Office (57) ABSTRACT

An antenna correcting system is provided. The antenna correction system compares amplitudes of antenna signals that are emitted or received respectively by a plurality of antenna units with each other to select one of the amplitudes as target amplitude. The antenna correction system corrects the amplitude of each of the antenna signals according to the target amplitude. As a result, the amplitudes of the antenna signals are the same as each other or approximate to each other. After the amplitudes of the antenna signals are corrected, the antenna correction system compares phases of the antenna signals with each other to select one of the phases as a target phase. The antenna correction system corrects the phase of each of the antenna signals according to the target phase. As a result, the phases of the antenna signals are the same as each other or approximate to each other.

11 Claims, 5 Drawing Sheets

(56) References Cited

U.S. PATENT DOCUMENTS

| | | | |
|---|---|---|---|
| 11,228,104 B2* | 1/2022 | Kihira | H04B 17/14 |
| 11,942,694 B2* | 3/2024 | Rafique | H04B 17/19 |
| 12,095,171 B2* | 9/2024 | Khalil | H01Q 21/22 |
| 2019/0273568 A1* | 9/2019 | Zhang | H04B 1/123 |
| 2020/0014105 A1* | 1/2020 | Braun | H01Q 3/267 |

* cited by examiner

| | AN1 | AN2 | AN3 | AN4 | AN5 | AN6 | AN7 |
|---|---|---|---|---|---|---|---|
| 0 | -72.3578 | -74.5751 | -73.98 | -74.0393 | -74.4282 | -74.2557 | -76.8486 |
| 1 | -69.3638 | -68.3946 | -71.2949 | -71.2974 | -70.8387 | -71.2824 | -72.3709 |
| 2 | -69.01 | -67.7868 | -69.315 | -70.8306 | -69.0057 | -69.2397 | -70.6523 |
| 3 | -68.1473 | -67.9218 | -69.4064 | -71.8888 | -70.0618 | -70.6283 | -72.7541 |
| 4 | -67.0268 | -68.2399 | -68.9312 | -69.5326 | -70.6916 | -69.2148 | -70.3957 |
| 5 | -69.8317 | -69.9252 | -71.7919 | -70.155 | -70.2133 | -70.9477 | -70.0881 |
| 6 | -73.7781 | -73.0446 | -74.7733 | -75.6597 | -74.0281 | -74.2568 | -75.0715 |
| 7 | -74.2214 | -75.4375 | -76.9716 | -77.0255 | -76.7692 | -78.2135 | -77.6733 |

FIG. 7

| | AN1 | AN2 | AN3 | AN4 | AN5 | AN6 | AN7 |
|---|---|---|---|---|---|---|---|
| 0 | -71.4594 | -72.6321 | -73.2766 | -72.7173 | -73.2499 | -73.4434 | -75.5226 |
| 1 | -71.4864 | -70.8495 | -71.938 | -71.6617 | -71.3395 | -70.9578 | -72.3538 |
| 2 | -69.2986 | -70.1781 | -69.6457 | -72.143 | -70.5037 | -70.265 | -72.0019 |
| 3 | -67.2979 | -67.3166 | -68.3145 | -70.6031 | -69.4098 | -70.6253 | -71.2605 |
| 4 | -67.779 | -67.6567 | -68.1759 | -69.3499 | -69.5655 | -68.9735 | -69.5964 |
| 5 | -70.7462 | -70.581 | -72.0317 | -71.0137 | -71.1174 | -71.5593 | -70.5511 |
| 6 | -73.6641 | -72.0651 | -74.0782 | -74.6911 | -73.4425 | -74.1852 | -74.0876 |
| 7 | -77.1671 | -77.4917 | -77.7738 | -77.2014 | -77.0821 | -77.6407 | -78.2759 |

FIG. 8

|   | AN1 | AN2 | AN3 | AN4 | AN5 | AN6 | AN7 |
|---|---|---|---|---|---|---|---|
| 0 | 40.58908 | 25.72085 | 15.4064 | 7.495628 | 2.759646 | -14.0036 | -3.00867 |
| 1 | -32.5544 | -35.3875 | -47.3289 | -55.5009 | -58.2569 | -69.2352 | -56.9024 |
| 2 | -102.862 | -123.166 | -125.64 | -140.618 | -140.904 | -149.079 | -139.077 |
| 3 | -155.189 | -173.925 | 177.0038 | 179.9283 | 161.7416 | 152.3227 | 168.2764 |
| 4 | 138.3451 | 122.4669 | 112.2126 | 120.7074 | 110.6081 | 100.993 | 118.8295 |
| 5 | 71.52073 | 61.31128 | 44.69441 | 44.41726 | 42.34135 | 25.44785 | 34.75241 |
| 6 | 18.65802 | -4.77754 | -14.9966 | -24.8857 | -32.4779 | -43.4075 | -37.539 |
| 7 | -43.292 | -58.5539 | -65.493 | -75.009 | -75.0874 | -88.3426 | -83.4227 |

FIG. 9

|   | AN1 | AN2 | AN3 | AN4 | AN5 | AN6 | AN7 |
|---|---|---|---|---|---|---|---|
| 0 | -86.7251 | -86.9655 | -84.856 | -84.1351 | -86.8218 | -85.9221 | -85.1075 |
| 1 | -88.2857 | -82.2969 | -89.7297 | -85.1037 | -86.8623 | -87.7996 | -86.3835 |
| 2 | -90.9405 | -92.84 | -90.4841 | -89.7267 | -87.8052 | -92.2927 | -96.1751 |
| 3 | -85.388 | -86.115 | -89.3088 | -87.5661 | -90.697 | -85.2956 | -88.5807 |
| 4 | -85.6126 | -87.3284 | -86.8772 | -85.9958 | -84.3216 | -87.5176 | -88.9134 |
| 5 | -90.4194 | -90.5515 | -85.0328 | -85.2297 | -90.8136 | -90.5832 | -92.9107 |
| 6 | -88.6692 | -95.8613 | -86.3085 | -87.8709 | -90.0833 | -89.5799 | -90.9138 |
| 7 | -85.1425 | -86.6949 | -87.186 | -86.3643 | -85.065 | -88.2955 | -86.051 |

FIG. 10

ANTENNA CORRECTION SYSTEM

CROSS-REFERENCE TO RELATED PATENT APPLICATION

This application claims the benefit of priority to Taiwan Patent Application No. 111141025, filed on Oct. 28, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to antennas, and more particularly to an antenna correcting system.

BACKGROUND OF THE DISCLOSURE

Antennas are indispensable components in a communication system. A plurality of antenna units may be arranged in an array on the same substrate. The antenna units arranged in the array are independent of each other. A plurality of signals that are emitted or received respectively by the plurality of antenna units may have different parameters such as different amplitudes and different phases. Under this condition, the parameters such as the amplitudes and the phases of the plurality of signals of the plurality of antenna units must be corrected such that the plurality of signals of the plurality of antenna units are the same as each other or approximate to each other.

SUMMARY OF THE DISCLOSURE

In response to the above-referenced technical inadequacies, the present disclosure provides an antenna correcting system. The antenna correcting system includes a signal measuring component, a target value determining component and a parameter correcting component. The signal measuring component is configured to measure a plurality of antenna signals respectively of a plurality of antenna units to obtain a plurality of parameters respectively of the plurality of antenna signals. The target value determining component is connected to the signal measuring component. The target value determining component is configured to compare the plurality of parameters of the plurality of antenna signals with each other to select one of the plurality of parameters of the plurality of antenna signals as a target value. The parameter correcting component is connected to the target value determining component. The parameter correcting component is configured to correct the parameter of each of the plurality of antenna signals according to the target value such that a difference between the parameter of each of the plurality of antenna signal being corrected and the target value is smaller than a parameter difference threshold or falls within a parameter difference threshold range. A difference between each two ones of the plurality of parameters of the plurality of antenna signals that are corrected is smaller than the parameter difference threshold or falls within the parameter difference threshold range.

In certain embodiments, the signal measuring component measures the plurality of antenna signals respectively of the plurality of antenna units multiple times. The plurality of antenna signals being measured each time have a same frequency. The same frequency of the plurality of antenna signals being measured each time is different from that measured previously. The target value determining component selects one of the plurality of antenna signals having the same frequency. The target value determining component uses the parameter of the one of the plurality of antenna signals having the same frequency as the target value of the plurality of antenna signals having the same frequency.

In certain embodiments, the plurality of antenna units include a plurality of signal transmitters configured to respectively emit the plurality of antenna signals.

In certain embodiments, the plurality of antenna units include a plurality of signal receivers configured to respectively receive the plurality of antenna signals.

In certain embodiments, the plurality of antenna units include a plurality of signal transmitters and a plurality of signal receivers. The plurality of antenna signals include a plurality of signals being emitted respectively by the plurality of signal transmitters, and a plurality of antenna signals being received respectively by the plurality of signal receivers.

In certain embodiments, the target value determining component compares the plurality of parameters of the plurality of antenna signals with each other to determine which some values of the plurality of parameters are equal to each other. The target value determining component selects one of the values that appears most frequently among the plurality of parameters as the target value.

In certain embodiments, the target value determining component sets a plurality of parameter reference ranges. The target value determining component determines each of the plurality of parameters falls in which one of the plurality of parameter reference ranges. The target value determining component selects one of the plurality of parameter reference ranges within which most of the plurality of parameters fall as a target range. The target value determining component obtains a value falling within the target range as the target value.

In certain embodiments, the target value determining component calculates an average value of all of the parameters that fall within the target range as the target value.

In certain embodiments, the plurality of parameters measured by the signal measuring component include a plurality of amplitudes and a plurality of phases of the plurality of antenna signals. The target value determining component selects one of the plurality of amplitudes of the plurality of antenna signals as a target amplitude. The target value determining component selects one of the plurality of phases of the plurality of antenna signals as a target phase. After the parameter correcting component corrects the amplitude of each of the plurality of antenna signals according to the target amplitude, the parameter correcting component corrects the phase of each of the plurality of antenna signals according to the target phase.

In certain embodiments, the signal measuring component measures a plurality of phases respectively of the plurality of antenna signals, and measures a phase difference between each two ones of the plurality of antenna signals. The plurality of parameters measured by the signal measuring component include the phase of each of the plurality of antenna signals, and the phase difference between each two ones of the plurality of antenna signals.

In certain embodiments, the target value determining component includes a target phase determining component. The target phase determining component is connected to the signal measuring component. The target phase determining component compares the phase difference between each two ones of the plurality of antenna signals with the phase difference between other two ones of the plurality of antenna signals. The target phase determining component determines which one of the plurality of antenna signals has the phase that is most approximate to the plurality of phases of others of the plurality of antenna signals. The target phase determining component uses the phase of the one of the plurality of antenna signals as a target phase.

In certain embodiments, the parameter correcting component includes a phase correcting component. The phase correcting component is connected to the target phase determining component. The phase correcting component corrects the phase of each of the plurality of antenna signals according to the target phase.

In certain embodiments, the signal measuring component measures an amplitude of each of the plurality of antenna signals. The plurality of parameters measured by the signal measuring component include the plurality of amplitudes respectively of the plurality of antenna signals.

In certain embodiments, the target value determining component includes a target amplitude determining component. The target amplitude determining component is connected to the signal measuring component. The target amplitude determining component compares the plurality of amplitudes of the plurality of antenna signals with each other to select one of the plurality of amplitudes of the plurality of antenna signals as a target amplitude.

In certain embodiments, the parameter correcting component includes an amplitude correcting component. The amplitude correcting component is connected to the target amplitude determining component. The amplitude correcting component corrects the amplitude of each of the plurality of antenna signals according to the target amplitude.

In certain embodiments, the plurality of antenna units are arranged in an array.

As described above, the present disclosure provides the antenna correcting system. The antenna correcting system of the present disclosure is able to correct the plurality of antenna signals that are emitted or received by the plurality of antenna units being disposed on the same substrate or classified in the same group. Therefore, by using the antenna correcting system of the present disclosure, the parameters such as the phases and the amplitudes of the plurality of antenna signals that are emitted or received by the plurality of antenna units being disposed on the same substrate or classified in the same group within the same time interval are (approximately) equal to each other.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
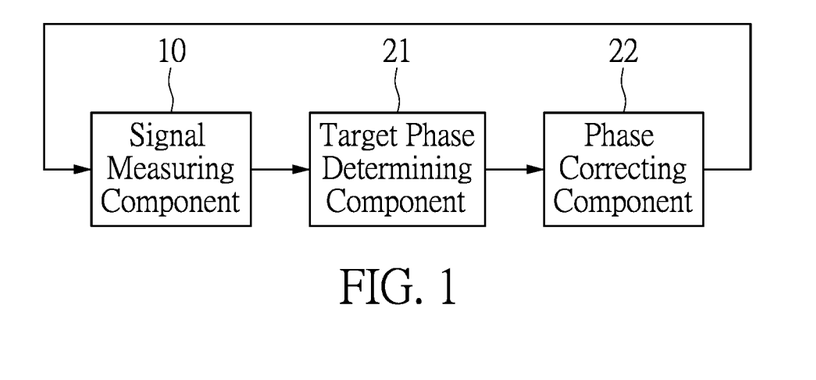
FIG. 1 is a block diagram of an antenna correcting system correcting phases of a plurality of antenna signals of a plurality of antenna units according to a first embodiment of the present disclosure.

Reference is made to FIG. 1, which is a block diagram of an antenna correcting system correcting phases of a plurality of antenna signals of a plurality of antenna units according to a first embodiment of the present disclosure.

The antenna correcting system of the present disclosure may include a signal measuring component 10, a target value determining component and a parameter correcting component. In the embodiment, the target value determining component includes a target phase determining component 21 shown in FIG. 1, and the parameter correcting component includes a phase correcting component 22 shown in FIG. 1.

As shown in FIG. 1, the target phase determining component 21 included in the target value determining component may be connected to the signal measuring component 10 and the phase correcting component 22 included in the parameter correcting component.

The signal measuring component 10 may measure the plurality of antenna signals that are received or emitted respectively by the plurality of antenna units to obtain a plurality of parameters respectively of the plurality of antenna signals. In the embodiment, the plurality of parameters measured by the signal measuring component 10 include the phase of each of the plurality of antenna signals, and a phase difference between each two ones of the plurality of antenna signals.

Then, the target value determining component compares the plurality of parameters respectively of the plurality of antenna signals with each other to select one of the plurality of parameters of the plurality of antenna signals as a target value. In the embodiment, the target phase determining component 21 included in the target value determining component as shown in FIG. 1 compares the phase difference between each two ones of the plurality of antenna signals with the phase difference between other two ones of the plurality of antenna signals. The target phase determining component 21, according to the phase differences between the plurality of antenna signals, determines which one of the plurality of antenna signals has the phase that is most approximate to the phases of others of the plurality of antenna signals. The target phase determining component 21 selects the one of the plurality of antenna signals and uses the phase of the one of the plurality of antenna signals as a target phase (that is the target value).

Alternatively, the target phase determining component 21 shown in FIG. 1 may randomly select one of the plurality of phases of the plurality of antenna signals as the target phase.

Finally, the parameter correcting component may correct, according to the target value, each of the plurality of parameters of the plurality of antenna signals of the plurality of antenna units. As a result, a difference between each of the corrected parameters of the plurality of antenna signals and the target value is smaller than a parameter difference threshold or falls within a parameter difference threshold range. Therefore, the difference between each two ones of the corrected parameters of the plurality of antenna signals is smaller than the parameter difference threshold or falls within the parameter difference threshold range.

In the embodiment, the phase correcting component 22 included in the parameter correcting component as shown in FIG. 1 corrects each of the plurality of phases of the plurality of antenna signals according to the target phase selected by the target phase determining component 21. As a result, a phase difference between each of the corrected phases of the plurality of antenna signals and the target phase is smaller than a phase difference threshold or falls within a phase difference threshold range. Therefore, a difference between each two ones of the plurality of phases of the plurality of antenna signals is smaller than the phase difference threshold or falls within the phase difference threshold range.

In the embodiment, each of the corrected phases of the plurality of antenna signals approximates to the target phase, and slightly leads or slightly lags the target phase, but the present disclosure is not limited thereto. In practice, each of the corrected phases of the plurality of antenna signals may be aligned with the target phase.

In other words, the target phase determining component 21 selects one of the plurality of antenna units as a reference antenna, and uses the phase of the reference antenna as the target phase. Then, the phase correcting component 22, according to the target phase, corrects all or some of the plurality of phases of the plurality of antenna signals of the plurality of antenna units except for the reference antenna such that the corrected phase of each of the plurality of antenna signals is (approximately) aligned with the target phase.

If necessary, after the plurality of phases of the plurality of antenna signals of the plurality of antenna units are corrected by the phase correcting component 22, the signal measuring component 10 may measure the phase of each of the plurality of antenna signals and the phase difference between each two ones of the plurality of antenna signals to determine whether or not the plurality of phases of the plurality of antenna signals are successfully corrected.

Figure 2:
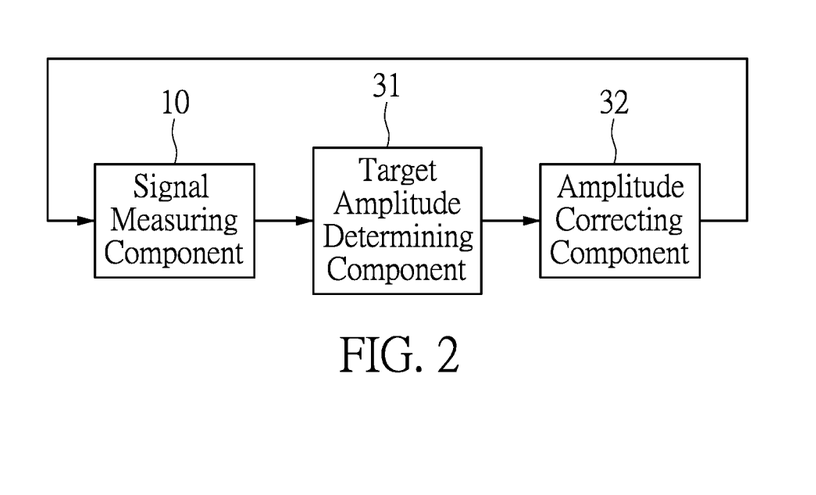
FIG. 2 is a block diagram of an antenna correcting system correcting amplitudes of the plurality of antenna signals of the plurality of antenna units according to a second embodiment of the present disclosure.

Reference is made to FIG. 2, which is a block diagram of an antenna correcting system correcting amplitudes of the plurality of antenna signals of the plurality of antenna units according to a second embodiment of the present disclosure.

The antenna correcting system of the present disclosure may include the signal measuring component 10, the target value determining component and the parameter correcting component. In the embodiment, the target value determining component includes a target amplitude determining component 31 shown in FIG. 2, and the parameter correcting component includes an amplitude correcting component 32 shown in FIG. 2.

As shown in FIG. 2, the target amplitude determining component 31 of the target value determining component is connected to the signal measuring component 10 and the amplitude correcting component 32 included in the parameter correcting component.

The signal measuring component 10 may measure the plurality of antenna signals that are received or emitted respectively by the plurality of antenna units to obtain the plurality of parameters respectively of the plurality of antenna signals. In the embodiment, the plurality of parameters measured by the signal measuring component 10 include the plurality of amplitudes of the plurality of antenna signals.

The target amplitude determining component 31 compares the plurality of amplitudes of the plurality of antenna signals with each other to select one of the plurality of amplitudes of the plurality of antenna signals as a target amplitude (that is the target value).

For example, the target amplitude determining component 31 may compare the plurality of amplitudes with each other to determine which some values of the plurality of amplitudes are equal to each other, and selects one of the values that appears most frequently among the plurality of amplitudes as the target value, but the present disclosure is not limited thereto.

Alternatively, (the target amplitude determining component 31 included in) the target value determining component may set a plurality of parameter reference ranges (such as a plurality of amplitude reference ranges). The target amplitude determining component 31 of the target value determining component may determine each of the plurality of parameters (such as the amplitudes) falls which one of the plurality of parameter reference ranges (such as the plurality of amplitude reference ranges). The target amplitude determining component 31 of the target value determining component may select one of the plurality of parameter reference ranges within which the most of the plurality of parameters fall as a target range. The (target amplitude determining component 31 included in) the target value determining component may obtain a value falling within the target range as the target value (such as the target amplitude). For example, the target amplitude determining component 31 may calculate an average value of all of the plurality of amplitudes that fall within the target range as the target amplitude. The target amplitude may be an integer value or a fractional value, but the present disclosure is not limited thereto.

Finally, the amplitude correcting component 32 may correct each of the plurality of amplitudes of the plurality of antenna signals according to the target amplitude selected by the target amplitude determining component 31. As a result, a difference between each of the corrected amplitudes of the plurality of antenna signals of the plurality of antenna units and the target amplitude is smaller than an amplitude difference threshold (included in the parameter difference threshold as described above) or falls within an amplitude difference threshold range (included in the parameter difference threshold range as described above). Therefore, a difference between each two ones of the corrected amplitudes of the plurality of antenna signals is smaller than the amplitude difference threshold or falls within the amplitude difference threshold range.

In other words, the target amplitude determining component 31 may select one of the plurality of antenna units as a reference antenna, and uses the amplitude of the reference antenna as the target amplitude. Then, the amplitude correcting component 32 may correct all or some of the plurality of amplitudes of the plurality of antenna signals of the plurality of antenna units except for the reference antenna such that each of the corrected amplitudes is equal to or approximates to the target amplitude that is the amplitude of the reference antenna.

If necessary, after the plurality of amplitudes of the plurality of antenna signals of the plurality of antenna units are corrected by the amplitude correcting component 32, the signal measuring component 10 may measure the amplitude of each of the plurality of antenna signals to determine whether or not the plurality of amplitudes of the plurality of antenna signals are successfully corrected.

Figure 3:
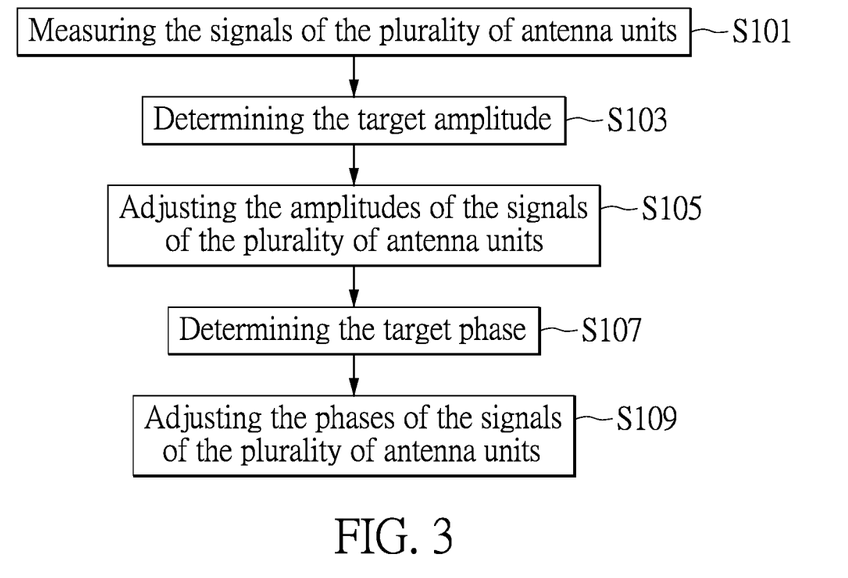
FIG. 3 is a flowchart diagram of an antenna correcting method correcting the phases and the amplitudes of the plurality of antenna signals of the plurality of antenna units according to a third embodiment of the present disclosure.

Reference is made to FIG. 3, which is a flowchart diagram of an antenna correcting method correcting the phases and the amplitudes of the plurality of antenna signals of the plurality of antenna units according to a third embodiment of the present disclosure.

The antenna correcting system of the present disclosure may include the target phase determining component 21 and the phase correcting component 22 as shown in FIG. 1, and the target amplitude determining component 31 and the amplitude correcting component 32 as shown in FIG. 2. The antenna correcting system of the present disclosure may perform steps S101 to S109 shown in FIG. 3 as described in the following.

In step S101, the signal measuring component 10 measures the plurality of parameters of the plurality of antenna signals respectively of the plurality of antenna units. The plurality of parameters measured by the signal measuring component 10 may include the plurality of amplitudes respectively of the plurality of antenna signals, the plurality of phases respectively of the plurality of antenna signals, and the phase difference between each two ones of the plurality of antenna signals.

In step S103, the target amplitude determining component 31 selects one of the plurality of amplitudes of the plurality of antenna signals of the plurality of antenna units as the target amplitude.

In step S105, the amplitude correcting component 32 corrects each of the plurality of amplitudes of the plurality of antenna signals of the plurality of antenna units according to the target amplitude.

In step S107, the target phase determining component 21 selects one of the plurality of phases of the plurality of antenna signals of the plurality of antenna units as the target phase.

In step S109, the phase correcting component 22 corrects each of the plurality of phases of the plurality of antenna signals of the plurality of antenna units according to the target phase.

It is worth noting that, in the embodiment, the plurality of phases of the plurality of antenna signals of the plurality of antenna units are corrected after the plurality of amplitudes of the plurality of antenna signals of the plurality of antenna units are corrected, but the present disclosure is not limited thereto. In practice, the phases of the plurality of antenna signals of the plurality of antenna units may be corrected before the amplitudes of the plurality of antenna signals of the plurality of antenna units are corrected.

Figure 4:
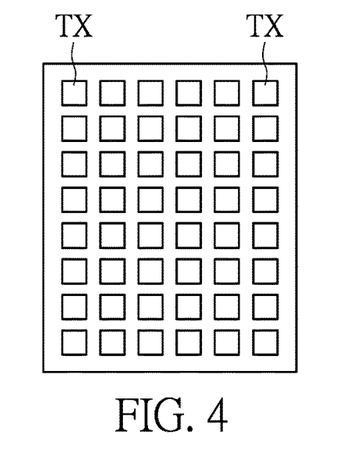
FIG. 4 is a schematic diagram of a plurality of signal transmitters that are arranged in an array and corrected by an antenna correcting system according to a fourth embodiment of the present disclosure.

Reference is made to FIG. 4, which is a schematic diagram of a plurality of signal transmitters that are arranged in an array and corrected by an antenna correcting system according to a fourth embodiment of the present disclosure.

The antenna correcting system of the present disclosure may include the target phase determining component 21 and the phase correcting component 22 as shown in FIG. 1, and the target amplitude determining component 31 and the amplitude correcting component 32 as shown in FIG. 2. The antenna correcting system of the present disclosure is applicable to the plurality of antenna units. For example, the plurality of antenna units may be a plurality of signal transmitters such as a plurality of signal transmitters TX arranged in an array on the same substrate as shown in FIG. 4.

The plurality of antenna signals measured by the signal measuring component 10 shown in FIGS. 1 and 2 may be a plurality of signals that are respectively emitted by the plurality of signal transmitters (disposed on the same substrate, arranged in the same array or classified in the same group) such as the plurality of signal transmitters TX as shown in FIG. 4.

The target amplitude determining component 31 shown in FIG. 2 may select one of the plurality of amplitudes of the plurality of signals emitted by the plurality of signal transmitters (disposed on the same substrate, arranged in the same array or classified in the same group) such as the plurality of signal transmitters TX, as the target amplitude. The amplitude correcting component 32 shown in FIG. 2 may, according to the target amplitude, correct each of the plurality of amplitudes of the plurality of signals emitted by the plurality of signal transmitters (disposed on the same substrate, arranged in the same array or classified in the same group) such as the plurality of signal transmitters TX.

The target phase determining component 21 shown in FIG. 1 may select one of the plurality of phases of the plurality of signals emitted by the plurality of signal transmitters (disposed on the same substrate, arranged in the same array or classified in the same group) such as the plurality of signal transmitters TX, as the target phase. The phase correcting component 22 shown in FIG. 1 may, according to the target phase, correct each of the plurality of phases of the plurality of signals emitted by the plurality of signal transmitters (disposed on the same substrate, arranged in the same array or classified in the same group) such as the plurality of signal transmitters TX.

Figure 5:
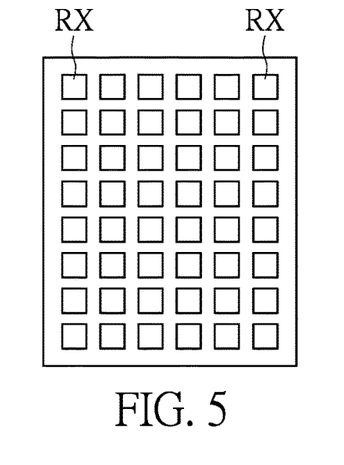
FIG. 5 is a schematic diagram of a plurality of signal receivers that are arranged in an array and corrected by an antenna correcting system according to a fifth embodiment of the present disclosure.

Reference is made to FIG. 5, which is a schematic diagram of a plurality of signal receivers that are arranged in an array and corrected by an antenna correcting system according to a fifth embodiment of the present disclosure.

The antenna correcting system of the present disclosure may include the target phase determining component 21 and the phase correcting component 22 as shown in FIG. 1, and the target amplitude determining component 31 and the amplitude correcting component 32 as shown in FIG. 2. The antenna correcting system of the present disclosure is applicable to the plurality of antenna units. For example, the plurality of antenna units may be a plurality of signal receivers such as a plurality of signal receivers RX arranged in an array on the same substrate as shown in FIG. 5.

The plurality of antenna signals measured by the signal measuring component 10 shown in FIGS. 1 and 2 may be a plurality of signals that are respectively received by the plurality of signal receivers (disposed on the same substrate, arranged in the same array or classified in the same group) such as the plurality of signal receivers RX as shown in FIG. 5.

The target amplitude determining component 31 shown in FIG. 2 may select one of the plurality of amplitudes of the plurality of signals received by the plurality of signal receivers (disposed on the same substrate, arranged in the same array or classified in the same group) such as the plurality of signal receivers RX, as the target amplitude. The amplitude correcting component 32 shown in FIG. 2 may, according to the target amplitude, correct each of the plurality of amplitudes of the plurality of signals received by the plurality of signal receivers (disposed on the same substrate, arranged in the same array or classified in the same group) such as the plurality of signal receivers RX.

The target phase determining component 21 shown in FIG. 1 may select one of the plurality of phases of the plurality of signals received by the plurality of signal receivers (disposed on the same substrate, arranged in the same array or classified in the same group) such as the plurality of signal receivers RX, as the target phase. The phase correcting component 22 shown in FIG. 1 may, according to the target phase, correct each of the plurality of phases of the plurality of signals received by the plurality of signal receivers (disposed on the same substrate, arranged in the same array or classified in the same group) such as the plurality of signal receivers RX.

Figure 6:
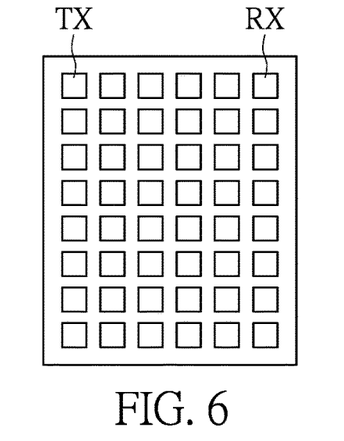
FIG. 6 is a schematic diagram of a plurality of signal transmitters and a plurality of signal receivers that are arranged in an array and corrected by an antenna correcting system according to a sixth embodiment of the present disclosure.

Reference is made to FIG. 6, which is a schematic diagram of a plurality of signal transmitters and a plurality of signal receivers that are arranged in an array and corrected by an antenna correcting system according to a sixth embodiment of the present disclosure.

The antenna correcting system of the present disclosure may include the target phase determining component 21 and the phase correcting component 22 as shown in FIG. 1, and the target amplitude determining component 31 and the amplitude correcting component 32 as shown in FIG. 2. The antenna correcting system of the present disclosure is applicable to the plurality of antenna units. For example, the plurality of antenna units may include a plurality of signal transmitters and a plurality of signal receivers such as a plurality of signal transmitters TX and a plurality of signal receivers RX that are arranged in an array on the same substrate as shown in FIG. 6.

The plurality of antenna signals measured by the signal measuring component 10 shown in FIGS. 1 and 2 may include a plurality of signals that are respectively emitted by the plurality of signal transmitters (disposed on the same substrate, arranged in the array or classified in the same group) such as the plurality of signal transmitters TX as shown in FIG. 6. In addition, the plurality of antenna signals measured by the signal measuring component 10 shown in FIGS. 1 and 2 may further include a plurality of signals that are respectively received by the plurality of signal receivers (disposed on the same substrate, arranged in the array or classified in the same group) such as the plurality of signal receivers RX as shown in FIG. 6.

The target amplitude determining component 31 shown in FIG. 2 may select one of the plurality of amplitudes of the plurality of signals emitted respectively by the plurality of signal transmitters (disposed on the same substrate, arranged in the array or classified in the same group) such as the plurality of signal transmitters TX, as the target amplitude of the plurality of signals emitted by the plurality of signal transmitters. The amplitude correcting component 32 shown in FIG. 2 may, according to the target amplitude of the plurality of signals emitted by the plurality of signal transmitters, correct each of the plurality of amplitudes of the plurality of signals emitted by the plurality of signal transmitters (disposed on the same substrate, arranged in the array or classified in the same group) such as the plurality of signal transmitters TX.

The target phase determining component 21 shown in FIG. 1 may select one of the plurality of phases of the plurality of signals emitted by the plurality of signal transmitters (disposed on the same substrate, arranged in the array or classified in the same group) such as the plurality of signal transmitters TX, as the target phase of the plurality of signals emitted by the plurality of signal transmitters. The phase correcting component 22 shown in FIG. 1 may, according to the target phase of the plurality of signals emitted by the plurality of signal transmitters, correct each of the plurality of phases of the plurality of signals emitted by the plurality of signal transmitters (disposed on the same substrate, arranged in the array or classified in the same group) such as the plurality of signal transmitters TX.

On the other hand, the target amplitude determining component 31 shown in FIG. 2 may select one of the plurality of amplitudes of the plurality of signals received by the plurality of signal receivers (disposed on the same substrate, arranged in the array or classified in the same group) such as the plurality of signal receivers RX, as the target amplitude of the plurality of signals received by the plurality of signal receivers. The amplitude correcting component 32 shown in FIG. 2 may, according to the target amplitude of the plurality of signals received by the plurality of signal receivers, correct each of the plurality of amplitudes of the plurality of signals received by the plurality of signal receivers (disposed on the same substrate, arranged in the array or classified in the same group) such as the plurality of signal receivers RX.

The target phase determining component 21 shown in FIG. 1 may select one of the plurality of phases of the plurality of signals received by the plurality of signal receivers (disposed on the same substrate, arranged in the array or classified in the same group) such as the plurality of signal receivers RX, as the target phase of the plurality of signals received by the plurality of signal receivers. The phase correcting component 22 shown in FIG. 1 may, according to the target phase of the plurality of signals received by the plurality of signal receivers, correct each of the plurality of phases of the plurality of signals received by the plurality of signal receivers (disposed on the same substrate, arranged in the array or classified in the same group) such as the plurality of signal receivers RX.

Figure 7:
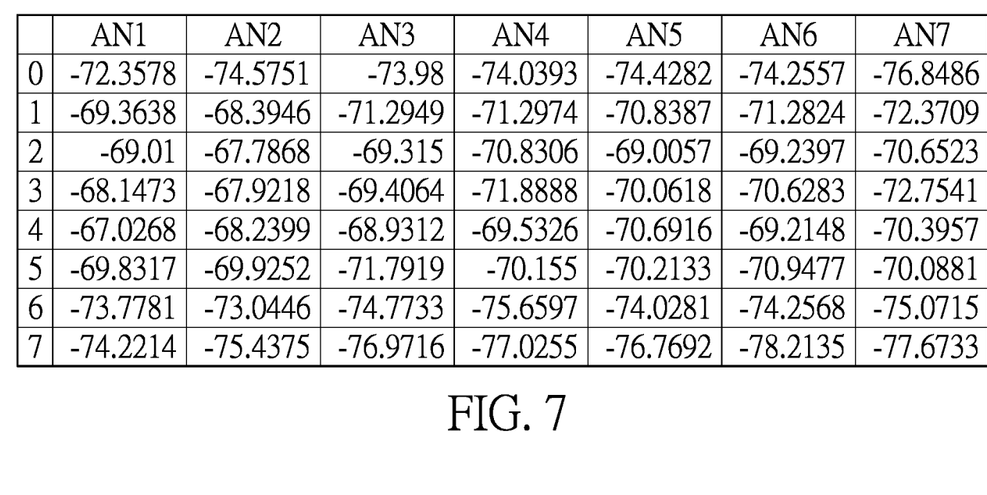
FIG. 7 is a schematic diagram of a plurality of amplitudes of a plurality of antenna signals that have different frequencies and are not corrected by an antenna correcting system according to a seventh embodiment of the present disclosure.
Figure 8:
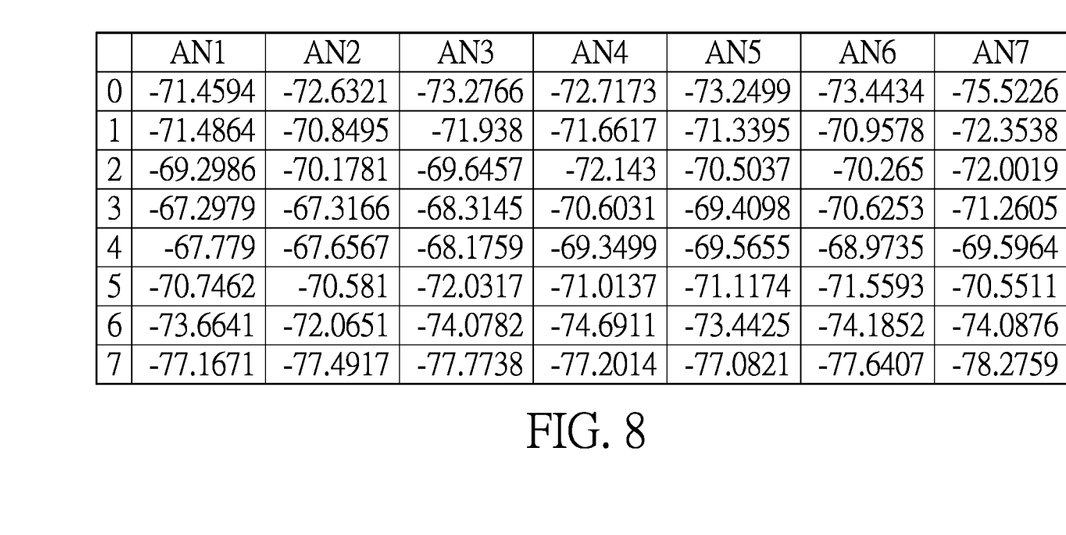
FIG. 8 is a schematic diagram of the plurality of amplitudes of the plurality of antenna signals that have the different frequencies and are corrected by the antenna correcting system according to the seventh embodiment of the present disclosure.

Reference is made to FIGS. 7 and 8, in which FIG. 7 is a schematic diagram of a plurality of amplitudes of a plurality of antenna signals that have different frequencies and are not corrected by an antenna correcting system according to a seventh embodiment of the present disclosure, and FIG. 8 is a schematic diagram of the plurality of amplitudes of the plurality of antenna signals that have the different frequencies and are corrected by the antenna correcting system according to the seventh embodiment of the present disclosure.

The antenna correcting system of the present disclosure such as the antenna correcting system shown in FIG. 1 or FIG. 2 may test the plurality of antenna units in a test operation. In the test operation, the plurality of antenna units may emit the plurality of antenna signals of different frequencies (in different emitting ranges) respectively within different time intervals. In the test operation, the plurality of antenna units may emit the plurality of antenna signals having the same frequency (in the same emitting range) within the same time interval.

The antenna correcting system may measure the plurality of antenna signals respectively of the plurality of antenna units multiple times. The frequencies of the plurality of antenna signals being measured by the antenna correcting system each time are the same as each other. The frequencies of the plurality of antenna signals being measured by the antenna correcting system each time are different from those are measured previously.

For example, as shown in FIG. 7, each of seven antenna units AN1 to AN7 emits eight antenna signals that have different frequencies and different amplitudes respectively within eight time intervals.

It is worth noting that, as shown in FIG. 7, the amplitudes of the antenna signals that are respectively emitted by the antenna units AN1 to AN7 within each one of the time intervals are different from each other. It is apparent that, the amplitudes of the antenna signals as shown in FIG. 7 are not corrected.

The antenna correcting system corrects (for example, attenuates) the amplitudes of the antenna signals as shown in FIG. 7 to form amplitudes of the antenna signals as shown in FIG. 8. As shown in FIG. 8, the corrected amplitudes of the antenna signals approximate to each other. In other words, a difference between each two ones of the corrected amplitudes of the plurality of antenna signals having the same frequency is smaller than the amplitude difference threshold or falls within the amplitude difference threshold range.

Figure 9:
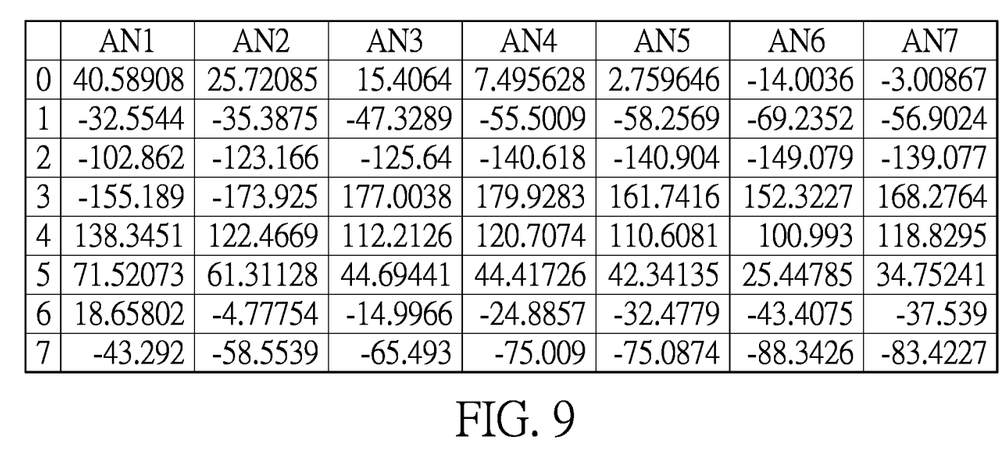
FIG. 9 is a schematic diagram of a plurality of phases of a plurality of antenna signals that have different frequencies and are not corrected by an antenna correcting system according to an eighth embodiment of the present disclosure.
Figure 10:
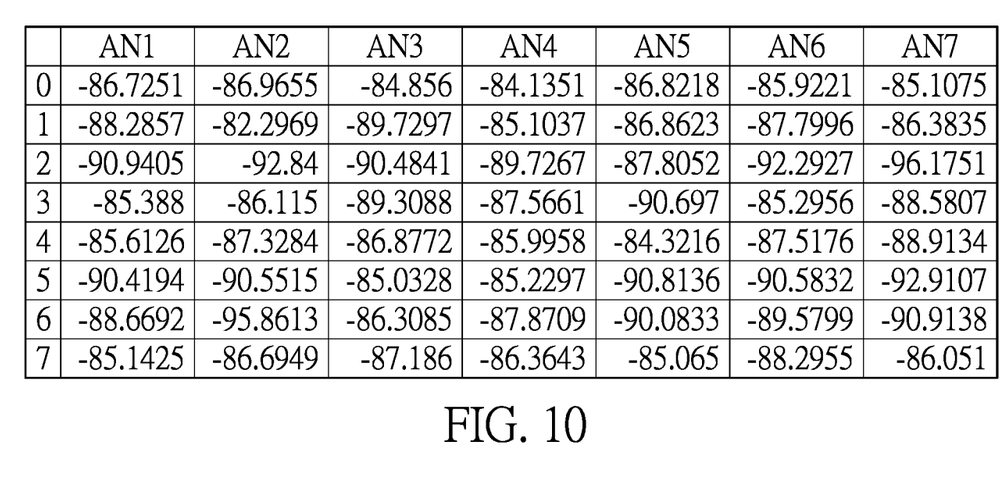
FIG. 10 is a schematic diagram of the plurality of phases of the plurality of antenna signals that have the different frequencies and are corrected by the antenna correcting system according to the eighth embodiment of the present disclosure.

Reference is made to FIGS. 9 and 10, in which FIG. 9 is a schematic diagram of a plurality of phases of a plurality of antenna signals that have different frequencies and are not corrected by an antenna correcting system according to an eighth embodiment of the present disclosure, and FIG. 10 is a schematic diagram of the plurality of phases of the plurality of antenna signals that have the different frequencies and are corrected by the antenna correcting system according to the eighth embodiment of the present disclosure.

The antenna correcting system of the present disclosure such as the antenna correcting system shown in FIG. 1 or FIG. 2 may test the plurality of antenna units in the test operation. In the test operation, the plurality of antenna units may emit the plurality of antenna signals of different frequencies (in different emitting ranges) respectively within different time intervals. In the test operation, the plurality of antenna units may emit the plurality of antenna signals having the same frequency (in the same emitting range) within the same time interval.

The antenna correcting system may measure the plurality of antenna signals respectively of the plurality of antenna units multiple times. The frequencies of the plurality of antenna signals being measured by the antenna correcting system each time are the same as each other. The frequencies of the plurality of antenna signals being measured by the antenna correcting system each time are different from that are measured previously.

For example, as shown in FIG. 9, each of the seven antenna units AN1 to AN7 emits eight antenna signals that have different frequencies and different phases respectively within eight time intervals.

It is worth noting that, as shown in FIG. 9, the phases of the antenna signals that are respectively emitted by the seven antenna units AN1 to AN7 within each one of the eight time intervals are different from each other. It is apparent that, the phases of the antenna signals as shown in FIG. 9 are not corrected. As shown in FIG. 9, the phase of each of the antenna signals that are not corrected falls within a range of −180° to 180°.

The antenna correcting system corrects (for example, attenuates) the phases of the antenna signals as shown in FIG. 9 to form phases of the antenna signals as shown in FIG. 10. As shown in FIG. 10, the corrected phases of the antenna signals approximate to each other. In other words, a difference between each two ones of the corrected phases of the plurality of antenna signals having the same frequency is smaller than the phase difference threshold or falls within the phase difference threshold range. As shown in FIG. 9, the phase of each of the antenna signals that are corrected approximates to −90° (that is the target phase).

In conclusion, the present disclosure provides the antenna correcting system. The antenna correcting system of the present disclosure is able to correct the plurality of antenna signals that are emitted or received by the plurality of antenna units being disposed on the same substrate or classified in the same group. Therefore, by using the antenna correcting system of the present disclosure, the parameters such as the phases and the amplitudes of the plurality of antenna signals that are emitted or received by the plurality of antenna units being disposed on the same substrate or classified in the same group within the same time interval are (approximately) equal to each other.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna correcting system, comprising:
   a signal measuring component configured to measure a plurality of antenna signals respectively of a plurality of antenna units to obtain a plurality of parameters respectively of the plurality of antenna signals;
   a target value determining component connected to the signal measuring component, and configured to compare the plurality of parameters of the plurality of antenna signals with each other to select one of the plurality of parameters of the plurality of antenna signals as a target value; and
   a parameter correcting component connected to the target value determining component, wherein the parameter correcting component is configured to correct the parameter of each of the plurality of antenna signals according to the target value such that a difference between the parameter of each of the plurality of antenna signal is reduced, and a difference between each two of the plurality of parameters of the plurality of antenna signals that are corrected is reduced;
   wherein the plurality of parameters include respective amplitudes of the plurality of antenna signals;
   wherein the target value determining component is configured to
      determine that each of the plurality of amplitudes falls within one of a plurality of amplitude reference ranges,
      select one of the plurality of amplitude reference ranges within which most of the plurality of amplitudes fall as a target range, and
      calculate an average value of all of the plurality of amplitudes falling within the target range as a target amplitude included in the target value.

2. The antenna correction system according to claim 1, wherein the plurality of antenna units include a plurality of signal transmitters configured to respectively emit the plurality of antenna signals.

3. The antenna correction system according to claim 1, wherein the plurality of antenna units include a plurality of signal receivers configured to respectively receive the plurality of antenna signals.

4. The antenna correction system according to claim 1, wherein the plurality of antenna units include a plurality of signal transmitters and a plurality of signal receivers, and the plurality of antenna signals include a plurality of signals being emitted respectively by the plurality of signal transmitters and a plurality of antenna signals being received respectively by the plurality of signal receivers.

5. The antenna correction system according to claim 1, wherein the plurality of parameters measured by the signal measuring component include a plurality of phases of the plurality of antenna signals, the target value determining component selects one of the plurality of phases of the plurality of antenna signals as a target phase, and the parameter correcting component corrects the phase of each of the plurality of antenna signals according to the target phase after the parameter correcting component corrects the amplitude of each of the plurality of antenna signals according to the target amplitude.

6. The antenna correction system according to claim 1, wherein the signal measuring component measures a plurality of phases respectively of the plurality of antenna signals, the signal measuring component measures a phase difference between each two ones of the plurality of antenna signals, and the plurality of parameters measured by the signal measuring component include the phase of each of the plurality of antenna signals and the phase difference between each two ones of the plurality of antenna signals.

7. The antenna correction system according to claim 6, wherein the target value determining component includes a target phase determining component connected to the signal measuring component, the target phase determining component compares the phase difference between each two ones of the plurality of antenna signals with the phase difference between other two ones of the plurality of antenna signals, the target phase determining component determines which one of the plurality of antenna signals has the phase that is most approximate to the plurality of phases of others of the plurality of antenna signals, and the target phase determining component uses the phase of the one of the plurality of antenna signals as a target phase.

8. The antenna correction system according to claim 7, wherein the parameter correcting component includes a phase correcting component connected to the target phase determining component, and the phase correcting component corrects the phase of each of the plurality of antenna signals according to the target phase.

9. The antenna correction system according to claim 1, wherein the target value determining component includes a target amplitude determining component connected to the signal measuring component;
   wherein the target amplitude determining component is configured to determine that each of the plurality of amplitudes falls which one of the plurality of amplitude reference ranges, select one of the plurality of amplitude reference ranges within which most of the plurality of amplitudes fall as the target range, and calculate the average value of all of the plurality of amplitudes falling within the target range as the target amplitude.

10. The antenna correction system according to claim 9, wherein the parameter correcting component includes an amplitude correcting component connected to the target amplitude determining component, and the amplitude correcting component corrects the amplitude of each of the plurality of antenna signals according to the target amplitude.

11. The antenna correction system according to claim 1, wherein the plurality of antenna units are arranged in an array.

* * * * *